United States Patent
Presley et al.

(10) Patent No.: US 10,647,247 B2
(45) Date of Patent: May 12, 2020

(54) VEHICLE ARTICLE CARRIER APPARATUS FOR SUPPORTING ARTICLES OF VEHICLE HAVING A CROSS-BAR INCLUDING A HEAT SINK ARRANGED ON A SECOND SURFACE FOR DISSIPATING HEAT

(71) Applicant: JAC Products, Inc., Saline, MI (US)

(72) Inventors: Michael J. Presley, Plymouth, MI (US); Gerald J. Gomes, Macomb, MI (US); Brendan J. Hathaway, Washington, MI (US); Jordan Rhody, Smiths Creek, MI (US)

(73) Assignee: JAC Products, Inc., Saline, MI (US)

( * ) Notice: Subject to any disclaimer, the term of this patent is extended or adjusted under 35 U.S.C. 154(b) by 0 days.

(21) Appl. No.: 16/182,193

(22) Filed: Nov. 6, 2018

(65) Prior Publication Data

US 2019/0135167 A1 May 9, 2019

Related U.S. Application Data

(60) Provisional application No. 62/582,708, filed on Nov. 7, 2017.

(51) Int. Cl.
| | |
|---|---|
| *B60Q 1/26* | (2006.01) |
| *F21S 45/47* | (2018.01) |
| *B60R 9/04* | (2006.01) |
| *B60R 9/052* | (2006.01) |

(52) U.S. Cl.
CPC ......... *B60Q 1/2661* (2013.01); *B60Q 1/2696* (2013.01); *B60R 9/04* (2013.01); *B60R 9/052* (2013.01); *F21S 45/47* (2018.01)

(58) Field of Classification Search
CPC .......... B60Q 1/266; B60Q 1/2696; B60R 9/08
See application file for complete search history.

(56) References Cited

U.S. PATENT DOCUMENTS

| | | | |
|---|---|---|---|
| 3,887,803 A | 6/1975 | Savage, Jr. | |
| 4,269,339 A | 5/1981 | Bott | |
| 4,426,028 A | 1/1984 | Bott | |
| 4,712,163 A | 12/1987 | Oxley | |
| 4,722,030 A | 1/1988 | Bowden | |
| 4,800,470 A | 1/1989 | Hartsaw | |
| 5,066,889 A | 11/1991 | Edwards | |
| 5,171,083 A | 12/1992 | Rich | |
| 5,347,434 A | 9/1994 | Drake | |
| 5,422,794 A | 6/1995 | Drake | |
| 5,495,400 A | 2/1996 | Currie | |
| 5,848,839 A | 12/1998 | Savage, Jr. | |
| 6,069,447 A | 5/2000 | Vilanilam et al. | |

(Continued)

*Primary Examiner* — Robert J May
(74) *Attorney, Agent, or Firm* — Harness, Dickey & Pierce, P.L.C.

(57) ABSTRACT

A vehicle article carrier apparatus is disclosed for supporting articles above an exterior body surface of a vehicle. The apparatus may have at least one cross bar adapted to be fixedly supported at opposite end portions thereof relative to the outer body surface, for supporting articles thereon above the outer body surface. The one cross bar has at least one light integrally mounted within at least a portion of an interior area thereof, and adjacent a first surface thereof, to enable the light to project light outwardly therefrom. The cross bar may also have a heat sink disposed on a second surface thereof for dissipating heat generated by the light.

18 Claims, 4 Drawing Sheets

(56) References Cited

U.S. PATENT DOCUMENTS

| | | |
|---|---|---|
| 6,114,954 A | 9/2000 | Palett et al. |
| 6,179,452 B1 | 1/2001 | Dunning |
| 6,550,414 B1 | 4/2003 | Correll et al. |
| 6,682,132 B1 | 1/2004 | Hahn |
| 6,702,370 B2 | 3/2004 | Shugar et al. |
| 6,779,696 B2 | 8/2004 | Aftanas et al. |
| 6,827,532 B1 | 12/2004 | Nix |
| 7,081,810 B2 | 7/2006 | Henderson et al. |
| 7,198,184 B2 | 4/2007 | Aftanas et al. |
| 7,377,674 B2 | 5/2008 | Klinkman et al. |
| 7,549,773 B2 | 6/2009 | Lim |
| 8,414,168 B2 | 4/2013 | Jutila et al. |
| 8,550,680 B2 | 10/2013 | Kim |
| 8,985,414 B2 | 3/2015 | Aftanas |
| 9,527,435 B2 | 12/2016 | Michie et al. |
| 9,616,819 B2 * | 4/2017 | Kmita .................... B60R 9/058 |
| 9,975,470 B2 | 5/2018 | Kozole et al. |
| 10,000,160 B2 | 6/2018 | Aftanas et al. |
| 2005/0212249 A1 | 9/2005 | Lopez |
| 2006/0220825 A1 | 10/2006 | Mertens |
| 2006/0291224 A1 | 12/2006 | England |
| 2007/0151188 A1 | 7/2007 | Aftanas |
| 2007/0205240 A1 | 9/2007 | Castro et al. |
| 2007/0217212 A1 | 9/2007 | Klinkman et al. |
| 2008/0037266 A1 | 2/2008 | Cunnien |
| 2008/0123359 A1 | 5/2008 | Larochelle |
| 2008/0128187 A1 | 6/2008 | Hu |
| 2008/0253139 A1 | 10/2008 | Stokes |
| 2009/0168441 A1 | 7/2009 | Lin et al. |
| 2011/0084102 A1 | 4/2011 | Sautter et al. |
| 2011/0174855 A1 | 7/2011 | Carothers et al. |
| 2011/0240695 A1 | 10/2011 | Aftanas |
| 2011/0317420 A1 | 12/2011 | Jeon et al. |
| 2012/0031939 A1 | 2/2012 | Jutila et al. |
| 2013/0106135 A1 | 5/2013 | Praskovsky et al. |
| 2013/0182428 A1 | 7/2013 | Seehof |
| 2014/0291957 A1 | 10/2014 | Muhe-Sturm |
| 2014/0313343 A1 | 10/2014 | Frank et al. |
| 2015/0180178 A1 | 6/2015 | Ranka et al. |
| 2017/0240099 A1 | 8/2017 | Shipman |

* cited by examiner

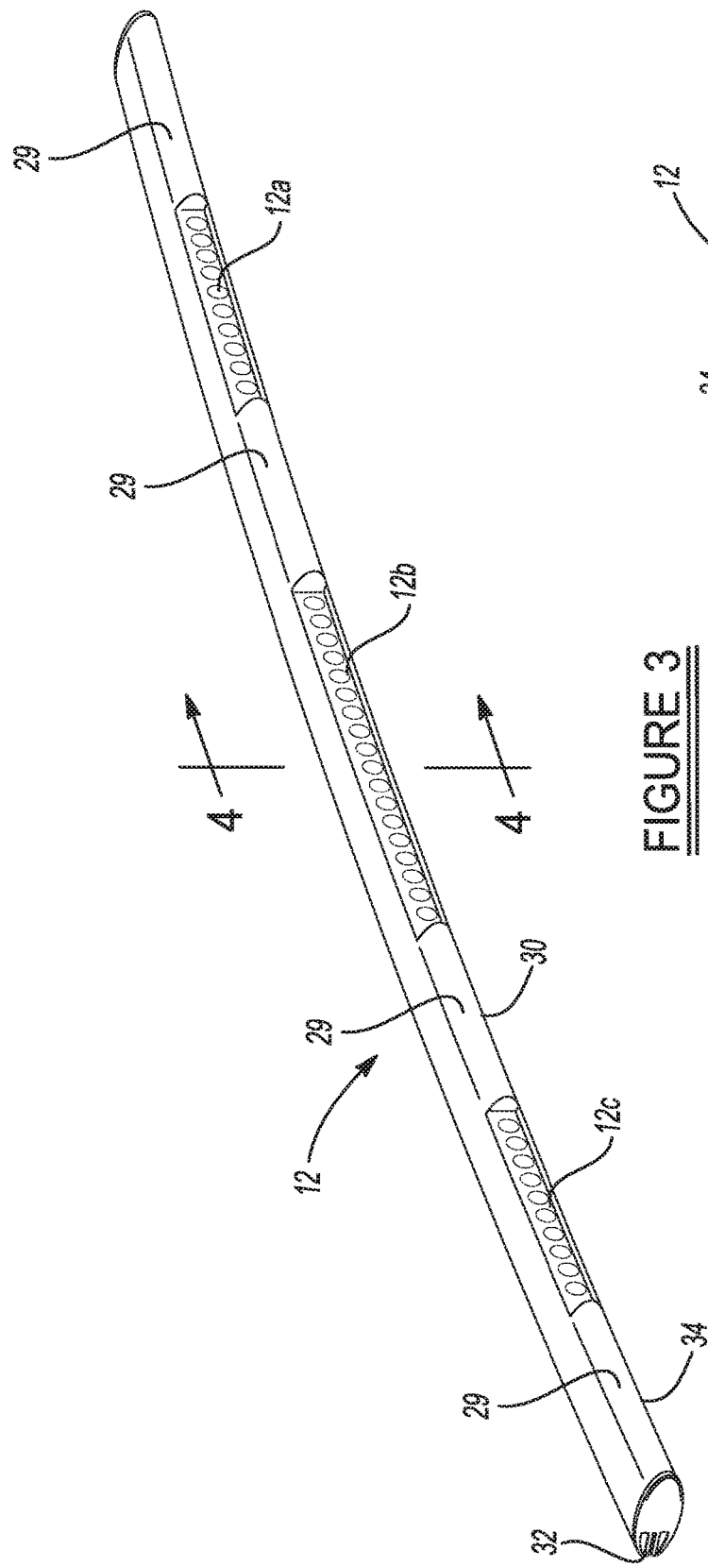
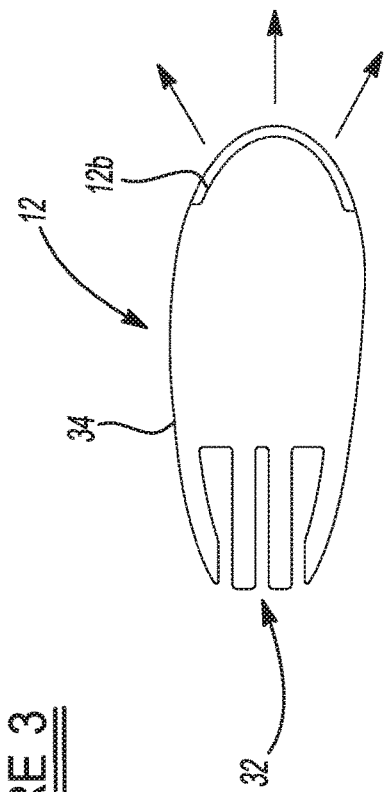
FIGURE 3
FIGURE 4

VEHICLE ARTICLE CARRIER APPARATUS FOR SUPPORTING ARTICLES OF VEHICLE HAVING A CROSS-BAR INCLUDING A HEAT SINK ARRANGED ON A SECOND SURFACE FOR DISSIPATING HEAT

CROSS-REFERENCE TO RELATED APPLICATIONS

This application claims the benefit of U.S. Provisional Application No. 62/582,708, filed on Nov. 7, 2017. The entire disclosure of the above application is incorporated herein by reference.

FIELD

The present disclosure relates to vehicle article carrier systems used to transport articles on an exterior surface of a motor vehicle, and more particularly to a vehicle article carrier system having at least one load bearing cross bar which includes integrated lighting.

BACKGROUND

The statements in this section merely provide background information related to the present disclosure and may not constitute prior art.

Vehicle article carriers have been widely used on exterior surfaces of motor vehicles such as cars, trucks, SUVs, vans and minivans, to support articles above an outer body surface of the body while the vehicle is being operated. A vehicle article carrier typically includes a pair of support rails that are secured parallel to a longitudinal length of the vehicle, and typically on a roof or trunk lid portion of the vehicle. One or more cross bars are often secured to the support rails. The cross bars are typically used to support articles thereon above an outer body surface of the vehicle, typically using external nylon straps, bungee cords, etc.

At present there is a desire to make better use of various exterior surfaces of a motor vehicle to provide at least some additional degree of lighting for the vehicle. For example, there is increasing interest in providing a small amount of additional light from exterior areas or components of the vehicle that serve to provide increased visibility of the vehicle to drivers of other vehicles, when the vehicle is being operated. As another example, there is an increased interest in providing a significant degree of additional lighting for the vehicle from one or more exterior components of a vehicle, to enhance road visibility when the driver is travelling off road, such as on trails, fire roads, etc. For this purpose, typically separate off road lights have been required which are attached somewhere on the exterior of the vehicle. Such separate off-road lights have traditionally been attached below the front bumper of the vehicle, above the front bumper, on truck bed mounted accessory components (headache racks), and above the roof via door jam mounts, just to name a few typical mounting arrangements. In all of these applications, however, independent lighting components were provided which need to be independently attached to the vehicle. As will be appreciated, certain of these mounting approaches can significantly detract from the aesthetics and aerodynamic profile of a vehicle, and/or potentially interfere with other components of the vehicle (e.g., air flow through a vehicle radiator and/or transmission cooler). Certain of these mounting approaches can also result in additional wind noise when the vehicle is travelling at highway speeds. Moreover, certain of these mounting approaches (e.g., front bumper mounting) give rise to a high risk of damage to the off-road lights from rocks thrown from the tires of other vehicles, from stationary rocks, from water thrown up from puddles, and from low lying brush and like vegetation. Still further, certain traditional mounting locations, while forming convenient attachment points for the off-road lights, do not necessarily position the lights at a level above the ground surface that provides optimum illumination and an optimum coverage pattern relative to the driver's seat location.

Accordingly, it would be highly desirable to provide a vehicle article carrier that also includes integrated high power off-road lighting, as well as integrated accessory lighting. Such a vehicle article carrier with integrated lighting would not detract from the aesthetics and aerodynamic qualities of the vehicle, would not interfere with other important subsystems of the vehicle (i.e., airflow through a radiator), and would place the off-road lights well above the bumper of the vehicle, which would serve to help protect the off-road lights from damage from other objects.

SUMMARY

This section provides a general summary of the disclosure, and is not a comprehensive disclosure of its full scope or all of its features.

In one aspect the present disclosure relates to a vehicle article carrier apparatus for supporting articles above an exterior body surface of a vehicle. The apparatus may comprise at least one cross bar adapted to be fixedly supported at opposite end portions thereof relative to the outer body surface, for supporting articles thereon above the outer body surface. The at least one cross bar may include at least one light integrally mounted within at least a portion of an interior area of the cross bar, and adjacent a first surface of the at least one cross bar, in a manner enabling the at least one light to project light outwardly from the at least one cross bar. The at least one cross bar may also include a heat sink disposed on a second surface thereof for dissipating heat generated by the at least one light.

In another aspect the present disclosure relates to a vehicle article carrier apparatus for carrying articles above an outer body surface of a vehicle. The apparatus may comprise first and second cross bars each configured to be secured against movement relative to the outer body surface of the vehicle. The first cross bar may include a first metallic housing and a first plurality of light emitting diodes (LEDs) at least partially housed in the first metallic housing, and may direct light therefrom in a first direction out toward a front portion of the vehicle from a first surface of the first cross bar. The first cross bar may also include a first heat sink formed on a second portion of the first cross bar for dissipating heat generated by the first plurality of LEDs. The second cross bar may include a second metallic housing and a second plurality of LEDs at least partially housed in a first surface of the second metallic housing, and may direct light therefrom in a second direction out toward a rear portion of the vehicle from the first surface of the second metallic housing. The second cross bar may include a second heat sink formed on a second portion of the second cross bar for dissipating heat generated by the second plurality of LEDs.

In still another aspect the present disclosure relates to a vehicle article carrier apparatus for carrying articles above an outer body surface of a vehicle. The apparatus may comprise first and second cross bars each configured to be secured against movement relative to the outer body surface of the vehicle. The first cross bar may include a first metallic housing and a first plurality of light emitting diodes (LEDs) housed in the first metallic housing, and directing light therefrom in a first direction out toward a front portion of the vehicle from a leading edge surface of the first cross bar, and a first heat sink formed on a trailing edge surface of the first cross bar for dissipating heat generated by the first plurality of LEDs. The second cross bar may include a second metallic housing and a second plurality of LEDs housed in a trailing edge surface of the second metallic housing. The second plurality of LEDs directs light therefrom in a second direction out toward a rear portion of the vehicle from the trailing edge surface of the second metallic housing. A second heat sink is formed on a leading edge surface of the second cross bar for dissipating heat generated by the second plurality of LEDs. Each of the first and second cross bars have a generally oval shape.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a perspective view of one of the cross bars shown in FIG. 1;

FIG. 4 is a high level cross sectional view of the cross bar of FIG. 3 taken in accordance with section line 4-4 in FIG. 3;

DETAILED DESCRIPTION

Figure 1:
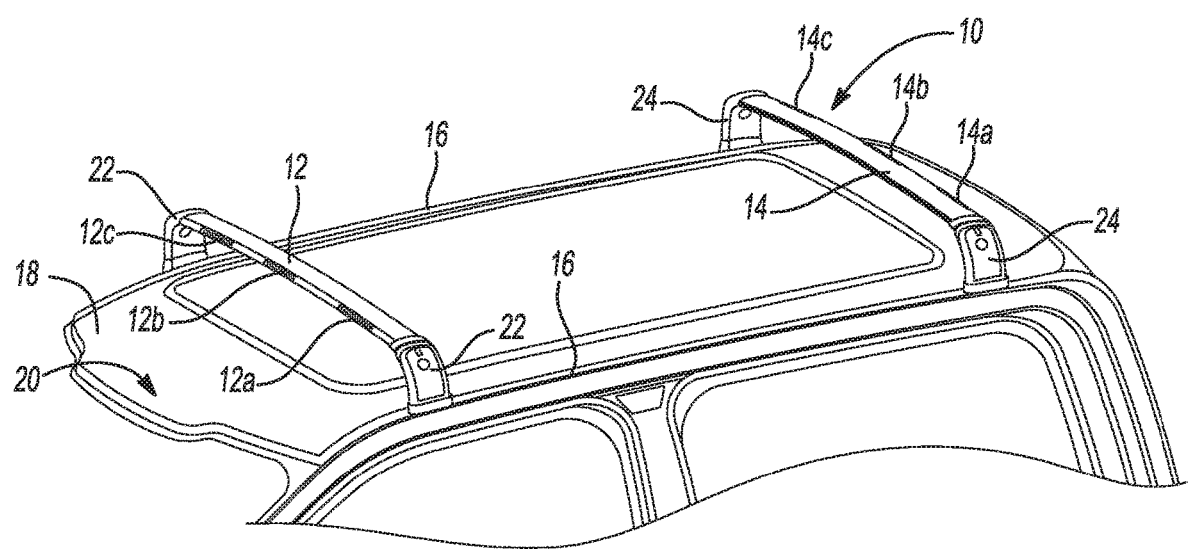
FIG. 1 is a perspective view of a vehicle article carrier system in accordance with one embodiment of the present disclosure, in which a forward edge of a forward mounted cross bar of the system has integrated lighting projecting a light beam forwardly, and a rear mounted cross bar has integrated lighting projecting a separate light beam rearwardly.

The following description is merely exemplary in nature and is not intended to limit the present disclosure, application, or uses. It should be understood that throughout the drawings, corresponding reference numerals indicate like or corresponding parts and features.

Referring to FIG. 1 a vehicle article carrier system 10 is shown in accordance with one embodiment of the present disclosure. The system 10 in this example includes a pair of cross bars 12 and 14 that may be secured at different predetermined locations along the ditch rails 16 on a roof 18 of a vehicle 20. The cross bars 12 and 14 include end pairs of supports 22 and 24, respectively, which may be fixedly secured to the ditch rails 16. The cross bars 12 and 14 may be identical in construction but they need not be identical.

Figure 2:
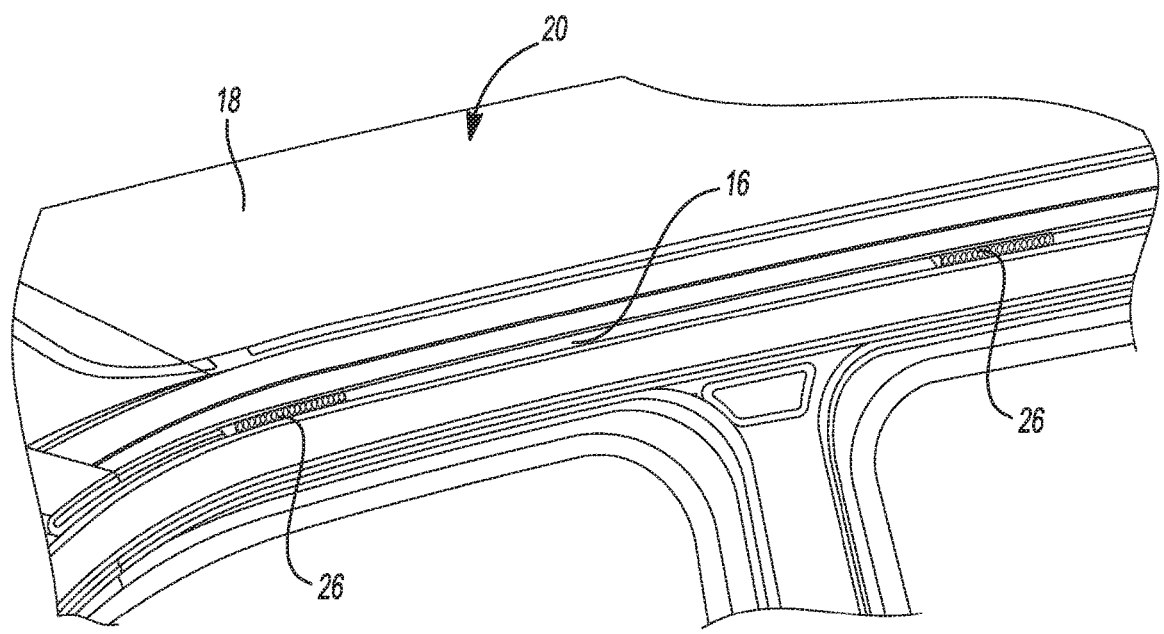
FIG. 2 is a perspective view of a portion of the vehicle roof shown in FIG. 1 but with the cross bars removed to better illustrate attachment points where the cross bars may be secured to a support rail of the vehicle article carrier system.

FIG. 2 shows the cross bar 12 having a plurality of lights, e.g., LED lights for example, 12a, 12b and 12c, which face forwardly relative to the vehicle 20 when the cross bar 12 is secured to the ditch rails 16. The cross bar 14 may similarly include a plurality of lights, e.g., LEDs 14a, 14b and 14c, which face rearwardly and thus are not visible in FIG. 1. For convenience, the lights 14a, 14b and 14c have been indicated by dashed lines in FIG. 1. It will be appreciated that the lights 12a-12c and 14a-14c need not be LED style lights, but could be comprised of virtually any other type of light or combinations of two or more different styles of lights (e.g., LED and incandescent). For this example, however, the lights 12a-12c and 14a-14c will be referred to in the following discussion as LED style lights.

If the cross bars 12 and 14 are identically constructed, then it may be possible to use either cross bar 12 or 14 as a front cross bar, and either one as the rear cross bar. Also, while the lights 12a-12c and 14a-14c have been illustrated as forming a plurality (e.g., three) distinct segments on each cross bar 12 and 14, the cross bars 12 and 14 could be constructed so that the lights 12a-12c and 14a-14c each form a single uninterrupted "light bar" that extends substantially a full length of its associated cross bar 12 or 14.

Referring to FIG. 2, a portion of the vehicle 20 is shown without the cross bars 12 and 14 secured to the roof 18 to illustrate locations 26 in the ditch rail 16 where the end supports 22 and 24 of the cross bars 12 and 14, respectively, may be secured. At points 26, electrical connectors (not visible) are present which may be connected to mating electrical connectors positioned within the end supports 22 and 24. In this manner electrical power may be provided to the lights 12a-12c and 14a-14c in the cross bars 12 and 14, respectively. While only two such locations 26 are shown in FIG. 2, it will be appreciated that two additional locations are present on the other ditch rail 16 which is not visible in FIG. 2.

Referring to FIG. 3, cross bar 12 is shown in greater detail. Each of lights 12a-12c in this example may include a plurality of independent LEDs. Virtually any number of LEDs may be used to form each light 12a-12c, although this number will be dependent on design preferences which include the amount of light (e.g., lumens) that each light is to generate, the dimensions (e.g., length and height) of the cross bar 12, and other design variables, the power that is available from the vehicle's electrical system, thermal limitations, physical load management, and additional sensor packaging. The spaces 29 adjacent the lights 12a-12c may be used for attaching nylon straps, bungee cords, etc., and the use of such securing implements does not impede the projection of light from the lights 12a-12c Additional LED lights could be disposed along a lower surface 30 of the cross bar 12 just as well for accent lighting. In this example, the lights 12a-12c form an off-road lighting system that is sufficiently powerful to project a useful light beam when operating the vehicle 20 off-road.

FIG. 4 shows a cross sectional view of the cross bar 12 illustrating integrally formed cooling fins 32 on the cross bar 12. The integrally formed cooling fins 32 may be formed simultaneously with the forming of a metallic housing portion 34 of the cross bar 12 during a manufacturing process, for example an extrusion molding process. The housing portion 34 may be made from aluminum or any other materials that are thermally conductive. The cooling fins 32 in this example are integrally formed cooling fins which remove the issue of how to manage heat buildup within the cross bar 12 without providing holes for air circulation. Obviously, the use of holes is undesirable as water and other elements could potentially enter the interior of the cross bar 12. The addition of holes may also generate wind noise during vehicle operation. Still further, while the cooling fins 32 are described in the following description as being integrally formed with the cross bar 12, the cooling fins 32 could be formed by an independent component or independent assembly of components that are affixed to the cross bar 12. Both implementations are envisioned by the present disclosure.

The use of cooling fins 32 on the cross bar 12 also forms a highly cost effective, easy to manufacture solution that does not otherwise require a redesign of the entire cross bar 12. Still further, the lights 12a-12c and the cooling fins 32 do not detract tangibly from the overall structural strength of the cross bar 12, which enables the cross bar to be used for its main purpose: supporting loads thereon. Another advantage is that the integrally formed cooling fins 32 do not detract appreciably from the aerodynamic shape and aesthetically pleasing profile of the cross bar 12. In FIG. 4 it can be seen that the integrally formed cooling fins 32 generally follow the cross sectional profile of the cross bar 12, and thus do not require increasing the cross sectional footprint of the cross bar 12.

Figure 5:
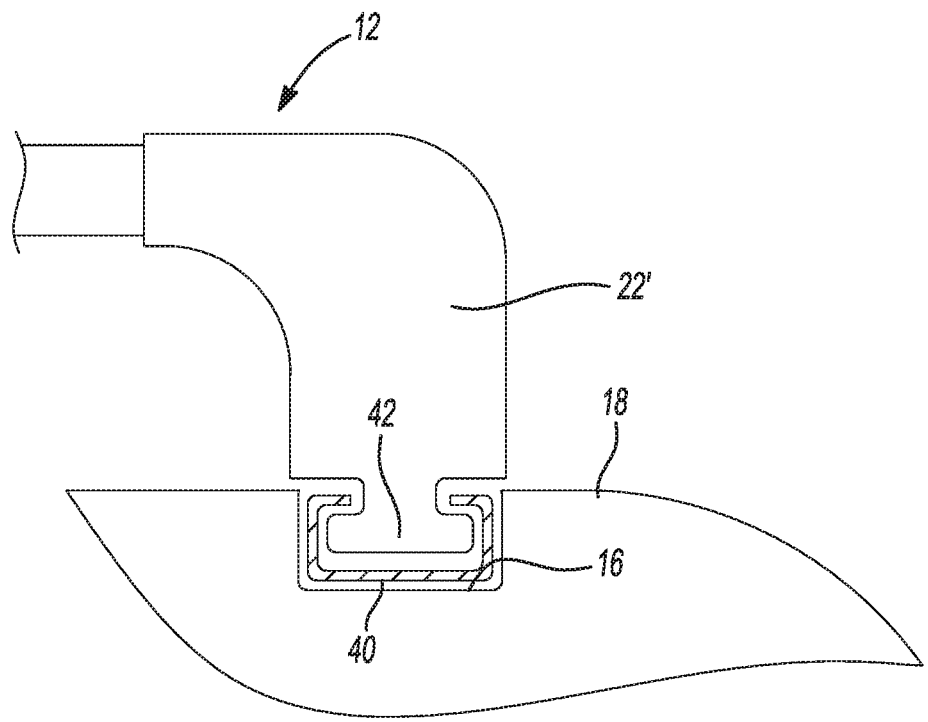
FIG. 5 is a high level cross sectional illustration showing another example of a construction for an end support portion for the cross bars of FIG. 1 which enables coupling of the end support of each cross bar to a roof ditch mounted support track while permitting a degree of longitudinal adjustment of the position of each cross bar.
Figure 6:
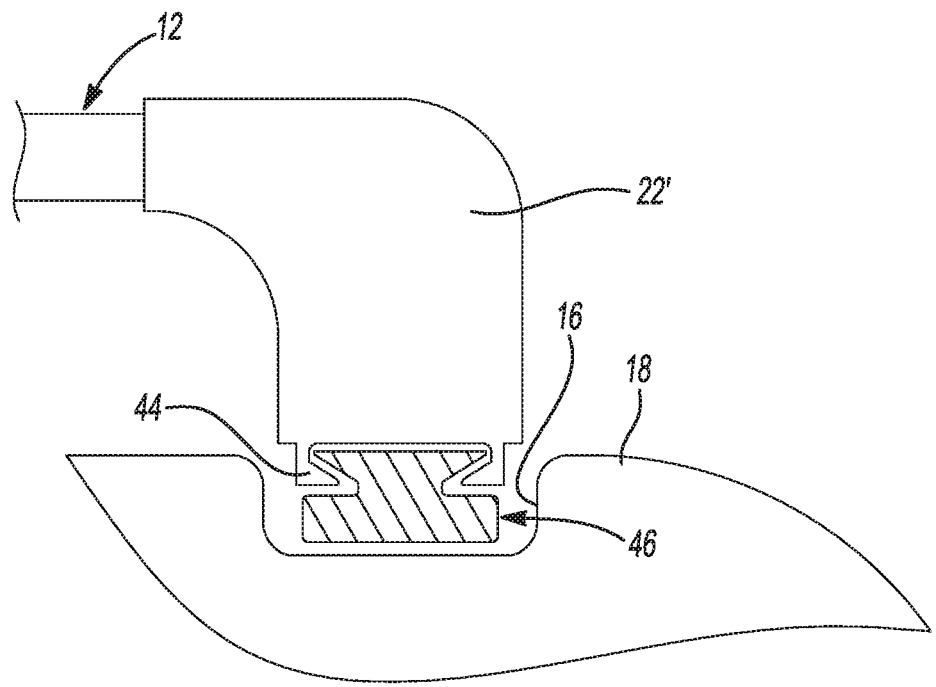
FIG. 6 is a high level cross sectional illustration of a variation of the end support construction shown in FIG. 5 to illustrate a different shaped support foot and track design that may be used to secure the end supports of the cross bars to their respective ditch rails while permitting a degree of longitudinal positioning of the cross bars.

FIGS. 5 and 6 show variations of the construction of the end support 22 that allows the end support to be adjustably positioned on a track 40 (FIG. 5) mounted in the ditch rail 16. In FIG. 5 an end support 22' is shaped with a foot portion 42 that mounts within the track 40. The track 40 in this example forms an upwardly facing C-shaped track. FIG. 6 shows another example of an end support 22" having a wedge shaped foot portion 44 that engages on a complementary shaped track 46. Thus, in both instances the end support 22' or 22" is free to slide along its respective track (40 or 46). The end supports 22' and 22" in this example will preferably have a locking mechanism that secures them at a desired point along the track.

Figure 7:
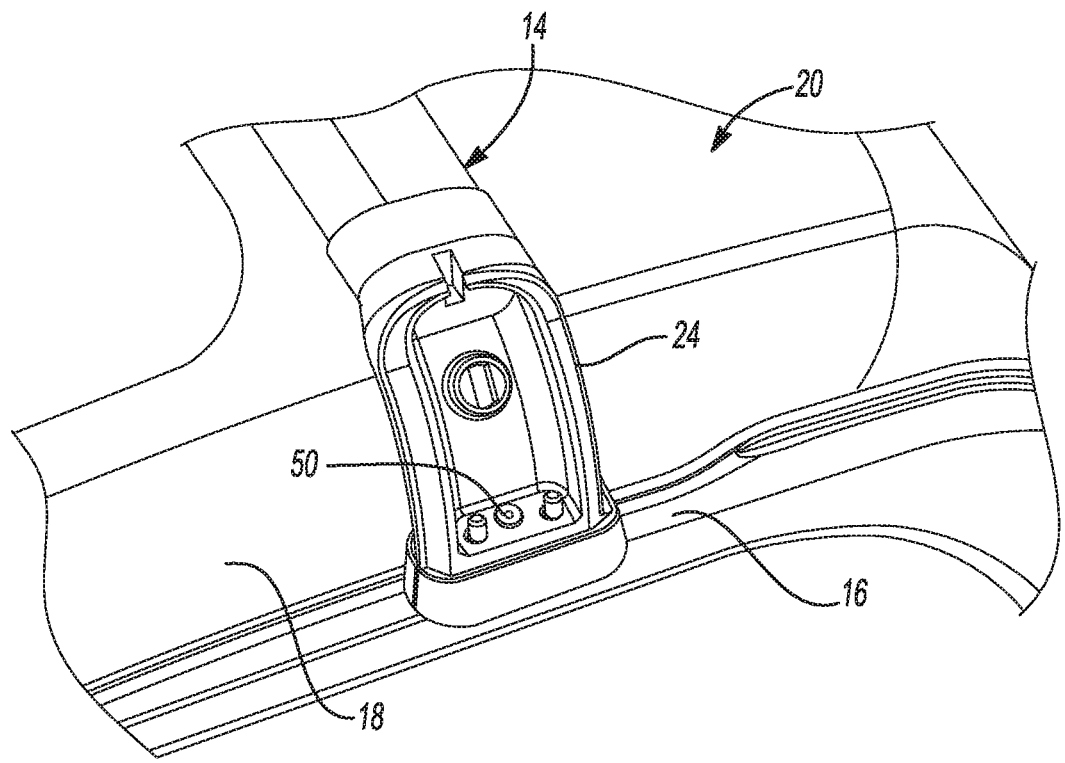
FIG. 7 is a perspective view showing one of the end supports of FIG. 1 with a fixed or "hard" mounting configuration, wherein the end support is secured to a fixed fastening (not visible in the figure)

FIG. 7 shows the end support 24 of the cross bar 12 with a cover element removed to expose a mounting fastener 50 to achieve a "hard" mounting to the ditch rail 16. In this example the ditch rail 16 may include an opening (not visible) where a threaded fastening element (not shown) may be mounted. Thus, the cross bar 14 in this example will be fixedly secured at both of its end supports 24 at a desired location along the ditch rails 16. Once secured, the cover element may be re-secured to each end support 24 to provide an aesthetically pleasing appearance.

Figure 8:
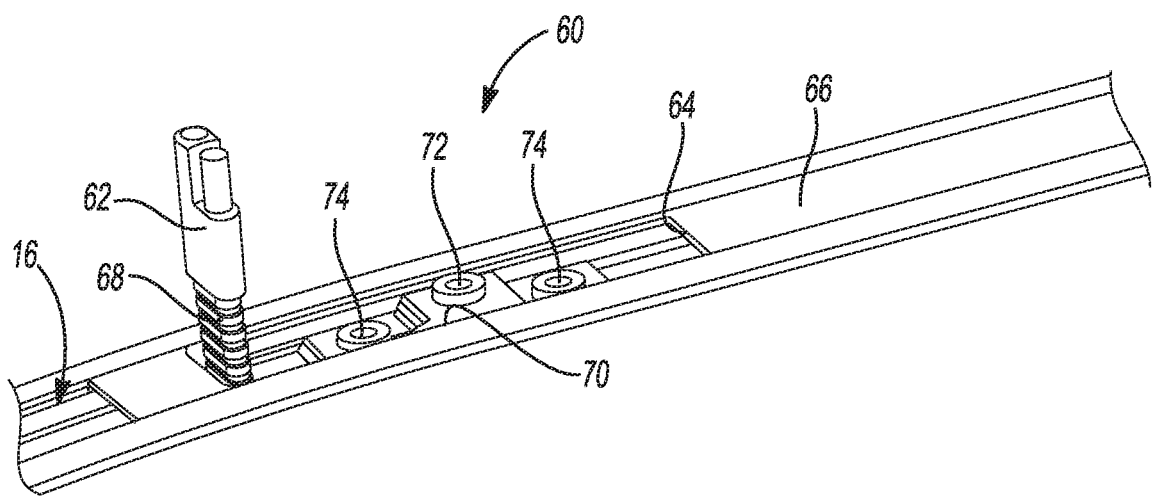
FIG. 8 is a perspective view of one embodiment of a ditch rail assembly of the present system that makes use of a flip up style electrical connector which can be accessed when needed for attachment to one of the end supports of a cross bar, and which can be positioned within the ditch rail assembly and covered by an external cover (not shown) when not needed for use.

FIG. 8 illustrates a ditch rail assembly 60 having a flip up power source connection 62 accessible through an opening 64 in a cover element 66 that covers the ditch rail 16. The flip up power source connection 62 may have a flexible insulating sheath 68 that enables the power source connection 62 to be laid down generally parallel to the ditch rail 16 when the cross bar 12 or 14 is detached from the vehicle roof 18, and covered using an external cover element (not shown). When the cross bar 12 or 14 is to be attached, the power source connection 62 can be lifted up and connected to a mating electrical connector in the end support (22 or 24) before the end support is fixedly secured to a mounting element 70 of the ditch rail assembly 60. The mounting element 70 includes a center threaded female fastener 72 which can be used to receive a threaded male fastener, such as the mounting fastening 50 in FIG. 7, to secure the end support (22 or 24) to the ditch rail assembly 60. Fasteners 74 in this example secure the mounting element 70 to the vehicle roof 18.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle article carrier apparatus for supporting articles above an outer body surface of a vehicle, the apparatus comprising:
    at least one cross bar adapted to be fixedly supported at opposite end portions thereof relative to the outer body surface, for supporting articles thereon above the outer body surface;
    the at least one cross bar including an elongated metallic housing and at least one light integrally mounted within at least a portion of an interior area of the elongated metallic housing of the cross bar, and adjacent a first surface of the elongated metallic housing of the at least one cross bar, in a manner enabling the at least one light to project light outwardly from the first surface
    the elongated metallic housing of the at least one cross bar including an integrally formed heat sink projecting from a second surface thereof for dissipating heat generated by the at least one light; and
    wherein the integrally formed heat sink is exposed to an ambient environment outside the elongated metallic housing of the at least one cross bar.

2. The apparatus of claim 1, further comprising a pair of support rails configured to be fixedly secured to the outer body surface, the at least one cross bar being securable at the opposing end portions thereof to the pair of support rails.

3. The apparatus of claim 2, wherein the at least one cross bar is positionable at different longitudinal positions along the support rails.

4. The apparatus of claim 1, further comprising:
    a pair of mounting elements disposed in a pair of ditch rails of the outer body surface; and
    wherein the at least one cross bar is fixedly secureable at the opposing end portions thereof to respective ones of the mounting elements.

5. The apparatus of claim 1, wherein the at least one light comprises a light emitting diode (LED).

6. The apparatus of claim 1, wherein the at least one light comprises a plurality of light emitting diodes (LEDs).

7. The apparatus of claim 1, wherein the heat sink is disposed along the second surface of the cross bar facing in a direction opposite to a direction in which the light is emitted by the light.

8. The apparatus of claim 1, wherein:
the at least one light comprises a plurality of light emitting diodes (LEDs) positioned in a plurality of groups along the first surface; and
the heat sink forms a plurality of fins.

9. The apparatus of claim 8, wherein the first surface is one of a leading edge surface or a trailing edge surface of the cross bar, and the second surface is the other one of the leading or trailing edge surface.

10. The apparatus of claim 4, wherein at least a portion of the LED is housed within the elongated metallic housing.

11. The apparatus of claim 1, wherein the at least one cross bar includes a pair of end supports at said opposing end portions, and the end supports are coupled to a ditch rail in the outer body surface.

12. The apparatus of claim 1, wherein:
the elongated metallic housing has a generally oval shape which includes the first and second surfaces, the first and second surfaces being on opposite facing portions of the elongated metallic housing;
the light comprises a plurality of light emitting diodes (LEDs); and
the second heat sink comprising a plurality of fins projecting from the second surface.

13. A vehicle article carrier apparatus for carrying articles above an outer body surface of a vehicle, the apparatus comprising:
first and second cross bars each configured to be secured against movement relative to the outer body surface of the vehicle;
the first cross bar including a first elongated metallic housing and a first plurality of light emitting diodes (LEDs) at least partially housed in the first elongated metallic housing, and directing light therefrom in a first direction out toward a front portion of the vehicle from a first surface of the first cross bar, and a first heat sink integrally formed on a second portion of the elongated metallic housing of the first cross bar, and exposed to an ambient environment outside of the first cross bar, for dissipating heat generated by the first plurality of LEDs; and
the second cross bar including a second elongated metallic housing and a second plurality of LEDs at least partially housed in a first surface of the second metallic housing, and directing light therefrom in a second direction out toward a rear portion of the vehicle from the first surface of the second elongated metallic housing, and a second heat sink formed on a second portion of the elongated metallic housing of the second cross bar, and exposed to the ambient environment outside of the second cross bar, for dissipating heat generated by the second plurality of LEDs.

14. The apparatus of claim 13, further comprising a pair of support rails fixedly secured to the outer body surface of the vehicle generally parallel to one another, the first and second cross bars being securable to the support rails.

15. The apparatus of claim 13, wherein the first and second cross bars each include a pair of end supports at opposite ends thereof, the end supports being securable to ditch rails formed in the outer body surface.

16. The apparatus of claim 13, wherein:
the first plurality of LEDs is formed in a plurality of first groups of LEDs, with each one of the first groups of LEDs being spaced apart from one another along a length of the first cross bar; and
the second plurality of LEDs is formed in a plurality of second groups of LEDs, with each one of the second groups of LEDs being spaced apart from one another along a length of the second cross bar.

17. The apparatus of claim 13, wherein the metallic housing of each one of the first and second cross bars comprises an oval shape.

18. A vehicle article carrier apparatus for carrying articles above an outer body surface of a vehicle, the apparatus comprising:
first and second cross bars each configured to be secured against movement relative to the outer body surface of the vehicle;
the first cross bar including a first elongated metallic housing and a first plurality of light emitting diodes (LEDs) housed in the first elongated metallic housing, and directing light therefrom in a first direction out toward a front portion of the vehicle from a leading edge surface of the first cross bar, and a first heat sink formed on a trailing edge surface of the first elongated metallic housing of the first cross bar for dissipating heat generated by the first plurality of LEDs;
the second cross bar including a second elongated metallic housing and a second plurality of LEDs housed in a trailing edge surface of the second elongated metallic housing, and directing light therefrom in a second direction out toward a rear portion of the vehicle from the trailing edge surface of the second elongated metallic housing, and a second heat sink formed on a leading edge surface of the second cross bar for dissipating heat generated by the second plurality of LEDs; and
wherein each of the first and second elongated metallic housings of the first and second cross bars has a generally oval shape.

* * * * *